United States Patent Office 3,509,145
Patented Apr. 28, 1970

3,509,145
1,2-UNSATURATED-QUINAZOLINE 3-OXIDES
George Francis Field, Nutley, and Leo Henryk Sternbach, Upper Montclair, N.J., assignors to Hoffmann-La Roche Inc., Nutley, N.J., a corporation of New Jersey
No Drawing. Original application Dec. 3, 1964, Ser. No. 415,793, now Patent No. 3,398,139, dated Aug. 20, 1968. Divided and this application Apr. 9, 1968, Ser. No. 735,483
Int. Cl. C07d 51/48
U.S. Cl. 260—251  1 Claim

ABSTRACT OF THE DISCLOSURE

A method for preparing quinazoline 3-oxides having 1,2 unsaturation consisting of treating a quinazoline 3-oxide having a hydrogen at the N–1 position and a dihalomethylene substituent at the 2-position with a strong base. The quinazoline 3-oxides are useful intermediates in the preparation of known pharmaceutically useful 5 - phenyl-1,3-dihydro-2H-1,4-benzodiazepin-2-one 4-oxides.

---

This application is a divisional application of Ser. No. 415,793, filed Dec. 3, 1964, now U.S. Patent No. 3,398,139, issued Aug. 20, 1968, which in turn is a continuation-in-part of Ser. No. 358,919, filed Apr. 10, 1964, and now abandoned, and Ser. No. 400,193, filed Sept. 29, 1964, and now abandoned.

This invention relates to compounds and conversions in the field of organic chemistry. More particularly, it relates to valuable processes for producing chemical intermediates, to novel chemical compounds useful as intermediates, to novel chemical compounds which are pharmaceutically useful, to methods for making them and also to methods for preparing known pharmaceutically useful compounds from said novel chemical intermediates.

5 - phenyl-1,3-dihydro-2H-1,4-benzodiazepin-2-one 4-oxides are a valuable class of organic compounds. One method of preparing these compounds consists of reacting a 2-aminobenzophenone β-oxime with a haloacetyl halide such as chloroacetyl chloride and subjecting the so-formed 2-haloacetamido benzophenone oxime intermediate to treatment with alkali whereby there is formed the desired 5-phenyl-1,3-dihydro-2H-1,4-benzodiazepin-2-one 4-oxide. 2-aminobenzophenone oximes are capable of two steric configurations. The α-stereo isomers are oximes in which the hydroxyl group is in the syn-position to the amino group, whereas in the β-isomers, the hydroxyl group is in the anti-position to the amino group. Only the β-oximes undergo the reaction sequence above outlined, which leads to 5-phenyl-1,3-dihydro-2H-1,4-benzodiazepin-2-one 4-oxides. Unfortunately, these β-oximes of 2-aminobenzophenones are less stable and more difficultly accessible than the corresponding α-oximes. It has been found that, in the presence of a heavy metal salt, α-oximes of the formula

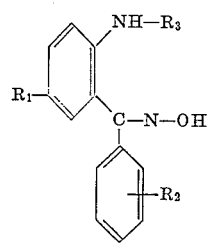

I wherein $R_1$ is selected from the group consisting of hydrogen, halogen, lower alkyl, lower alkoxy, nitro, trifluoromethyl, cyano and lower alkylthio; $R_2$ is selected from the group consisting of hydrogen and halogen; and $R_3$ is hydrogen, lower alkyl, cyclo-lower alkyl or cyclo-lower alkyl-lower alkyl can be reacted with ketones or aldehydes of the formula

II wherein $R_3$ and $R_4$ are each independently selected from the group consisting of hydrogen, lower alkyl, halo-lower alkyl, amino lower alkyl, aza-cyclo-lower alkyl-lower alkyl, and together, lower alkylene, aza-lower alkylene and N-lower alkyl-aza-lower alkylene to form 1,2-dihydro-quinazoline 3-oxides of the formula

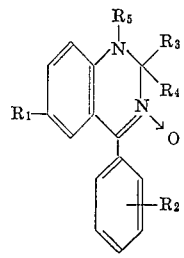

III wherein $R_1$, $R_2$, $R_3$, $R_4$ and $R_5$ have the same meaning as above and the so-formed 1,2-dihydro-quinazoline 3-oxides can then be cleaved to yield β-oximes of Formula I above.

As used herein, lower alkyl comprehends both straight and branched chain saturated hydrocarbon groups having from 1 to 7 carbon atoms, such as methyl, ethyl, isopropyl and the like. The terms halo, halogen, halide, etc., comprehend all four halogens, i.e., bromine, chlorine, fluorine and iodine. The term halo-lower alkyl comprehends lower alkyl groups in which one or more of the hydrogen atoms have been replaced by halogen atoms. Where more than one halogen atom is present, they can be the same or different halogens. When the moiety $R_1$, $R_3$ or $R_4$ comprehends halogen or a halogen-containing group, then bromine or chlorine is preferred. When the moiety $R_2$ comprehends a halogen atom, then chlorine or fluorine is preferred. When the moiety $R_3$ or $R_4$ comprehends a halo-lower alkyl, then the α-mono-halo lower alkyls and the α,α-dihalo-lower alkyls such as α-mono-chloromethyl, α,α-dichloromethyl and the like are preferred. The term amino lower alkyl comprehends unsubstituted as well as mono- and di-substituted amino alkyl groups, preferably mono-lower alkyl and di-lower alkyl-amino alkyl groups. The term aza-cyclo-lower alkyl-lower alkyl comprehends saturated nitrogen containing heterocyclic rings preferably containing 5 or 6 ring atoms, such as piperidino or the like, bonded to the 2-position carbon atom of the quinazoline ring via a lower moiety. When $R_3$ and $R_4$ are taken together and have the meaning lower alkylene, there is comprehended a straight or branched chain hydrocarbon group, forming together with the 2-position carbon atom in Formula II, a cycloalkyl moiety, for example, cyclohexyl, or with the carbonyl radical in Formula II a cycloalkyl ketone, such as a cyclohexanone. Similarly, when $R_3$ and $R_4$, taken together, are aza-lower alkylene, there is comprehended a moiety which, taken together with the 2-position carbon atom in Formula III, is a saturated nitrogen-containing heterocyclic ring, such as piperidine, or with the carbonyl radical in Formula II a piperidone, e.g., a 4-piperidone such as 1-methyl-4-piperidone. When $R_3$ and $R_4$ together are N-lower alkyl-aza-lower alkylenes, then said saturated nitrogen-containing heterocyclic ring contains a lower alkyl substituent on its aza-nitrogen atom; for example, as in N-3-di(lower alkyl)-piperidine or N-lower alkyl-piperidine.

The process of this invention whereby an oxime of Formula I is condensed with a ketone or aldehyde of Formula II to form a 1,2-dihydro-quinazoline 3-oxide of Formula III can be conducted utilizing the ketone or aldehyde of Formula II as the reaction medium. However, it can also be conducted in an inert organic solvent, preferably one in which the oxime is substantially soluble, for example, a lower alkanol such as methanol, ethanol or the like, ether, dioxane, tetrahydrofuran, diglyme, a hydrocarbon such as benzene, toluene, or the like. The reaction can be conducted at room temperature, elevated temperatures, or below room temperature. When reacting an α-oxime of Formula I, a heavy metal salt is suitably added to the reaction medium. The anionic part of the heavy metal salt is not critical and can be derived either from an organic or inorganic acid, preferably the latter. It has been found especially suitable to utilize a cupric salt, for example, cupric sulfate, i.e., to conduct the reaction in the presence of a cupric salt, e.g., cupric sulfate. The amount of cupric sulfate used does not appear to be critical, but it has been found that cupric salts such as cupric sulfate exert a favorable influence on the reaction of the α-oxime of Formula I with a ketone or aldehyde of Formula II. Accordingly, the reaction of an α-oxime of Formula I with a ketone or aldehyde of Formula II in the presence of a cupric salt, such as cupric sulfate is a preferred embodiment of this invention. The reaction of a compound of Formula II with a β-oxime of Formula I is suitably conducted in the presence of a heavy metal salt, as described above for α-oxime or in the presence of a basic or acidic catalyst. The quantity of catalyst present is not critical. Moreover, the catalyst can be either inorganic or organic, for example, a suitable basic catalyst is pyridine or the like and suitable acidic catalysts are hydrohalic acids such as hydrochloric acid, hydrobromic acid, acetic acid or the like.

In another aspect of this invention 1,2-dihydro-quinazoline 3-oxides of Formula III can be cleaved by acid hydrolysis to yield β-oximes of Formula I. The acid hydrolysis is suitably conducted in the presence of water at room temperature, below room temperature or at an elevated temperature (but the temperature should not be so high as to destroy the desired β-oxime). The hydrolysis can, if desired, be carried out in an organic solvent such as, for example, a lower alkanol, for example, methanol, ethanol or the like, dioxane, tetrahydrofuran, dimethyl sulfoxide or the like, organic solvents which themselves are not subject to acid hydrolysis.

In another embodiment of the invention, the cleavage is conducted in the presence of a ketone or aldehyde of Formula II whereby the moiety represented by the symbols $R_3$ and $R_4$ taken together with the 2-position carbon atom in Formula III can be replaced by a different moiety, for example, by subjecting a compound of Formula III wherein $R_3$ and $R_4$ are each methyl, to acid hydrolysis in the presence of chloroacetone, there can be obtained a compound of Formula III wherein one of $R_3$ and $R_4$ is methyl and the other is chloromethyl.

Preferred ketones of Formula II which can be used in the reaction with oximes of Formula I are, for example, acetone, chloroacetone, dichloroacetone, 1-methyl-4-piperidone, 1,3-dimethyl-4-piperidone, piperidinoacetone and cyclohexanone. Especially preferred ketones for the conversion into β-oximes are di-lower alkyl ketones, such as acetone and methyl ethyl ketone and cyclo-lower alkanones, such as cyclohexanone. Preferred aldehydes of Formula II which can be used in said reaction are acetaldehyde, chloroacetaldehyde and dichloroacetaldehyde.

In still another embodiment of this invention the compounds of Formula III above wherein $R_3$ and $R_5$ are both hydrogen and $R_4$ is an α,α-dihalo lower alkyl group can be subjected to a variety of reactions leading to known pharmaceutically valuable compounds. They can be dehydrohalogenated to form the corresponding quinazoline compounds. These process steps can be illustrated graphically by the following diagrammatic flowsheet.

FLOWSHEET A

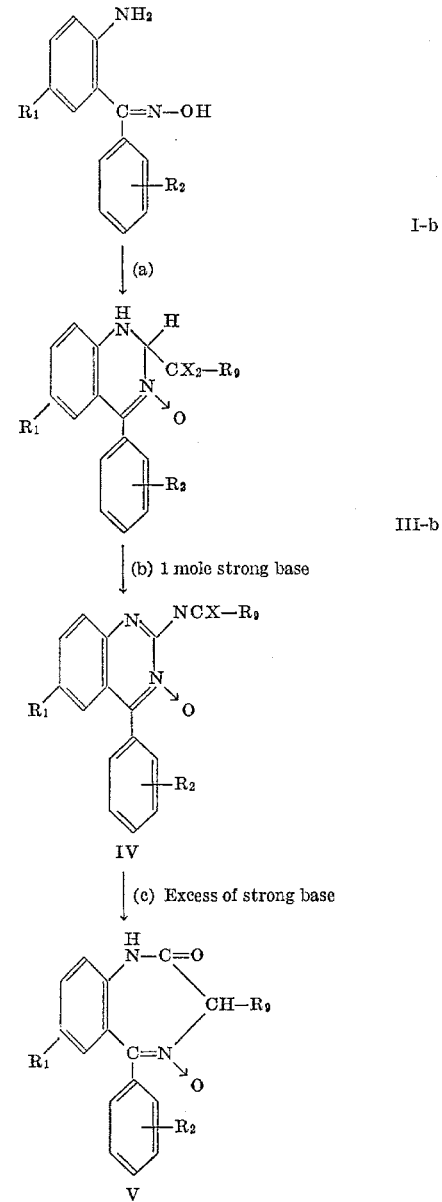

The symbols $R_1$ and $R_2$ in the formulas above have the same meaning as ascribed to like symbols hereinbefore. The symbol $R_9$ represents hydrogen or alkyl of 1 to 6 C atoms; and X represents halogen.

The preparation of the dihydroquinazoline compounds of Formula III–b as represented in step (a) above can be effected by any of the previously described methods.

In another particular process embodiment of this invention the dihydroquinazolines of Formula III–b can be converted to the corresponding quinazoline compounds of Formula IV by treatment with a strong base, more especially a non-nucleophilic strong base such as, for example, an alkali metal tertiary alcoholate, preferably a lower alkyl alcoholate such as sodium or potassium t-butoxide or sodium or potassium t-amylate, etc.; an alkali metal hydride, e.g., sodium hydride, etc.; an alkali metal triphenyl methide, e.g., sodium triphenyl methide, etc.; or an alkali metal secondary amide, e.g., sodium diethyl amide, etc. The compounds of Formula IV are known compounds useful as intermediates in the preparation of pharmaceutically valuable compounds. This particular process aspect of the invention is represented graphically by steps (a) and (b) in the above diagram. The reaction leading to the formation of compounds of Formula IV, i.e., step (b) in the diagram is preferably carried out with about one mole of the nonnucleophilic strong base per mole of the dihydroquinazoline compound, though, if desired, the quinazoline compound can be used in excess. The reaction can be carried out in any inert organic solvent, such as, for example, ethers, dioxane, tetrahydrofuran, hydrocarbons such as benzene, toluene and the like. The reaction can be carried out at room temperature or above or below room temperature. It is preferred, however, to carry out the reaction at a temperature between about −30° and +30° C. Compounds of Formula IV are base labile and can be converted to compounds of Formula V by employing a large molar excess of strong base.

In still another particular process embodiment of this invention the dihydroquinazolines of Formula III–b can be treated with base whereby the quinazoline compound undergoes ring expansion to form the corresponding benzodiazepin-2-one 4-oxides of Formula X. This particular process aspect of the invention is represented by steps (a) and (d) in the above diagram. The ring expansion of compounds of Formula III–b to benzodiazepin-2-one 4-oxides is preferably effected with an aqueous solution of a strong base such as an alkali metal hydroxide as, for example, sodium or potassium hydroxide. The reaction is preferably carried out in an inert organic solvent such as an alcohol, for example, ethanol or methanol. The reaction can be conducted at room temperature or above or below room temperature though it is preferred to use an elevated temperature. A suitable temperature is between about room temperature and the boiling point of the reaction mixture.

The following examples are illustrative of the invention. All temperatures are in ° C. When it is specified that an oxime of "unspecified configuration" is utilized as a starting material, it is to be understood that this comprehends a mixture of the α- and β-stereoisomers.

EXAMPLE 1

The α-oxime of 2-amino-5-chlorobenzophenone (10 g.), acetone (100 ml.) and cupric sulfate pentahydrate (0.5 g., finely ground) were heated under reflux for 2 hours. Yellow product soon began to crystallize out. The reaction mixture was cooled to room temperature and the product filtered off. It was resuspended in water (75 ml.), filtered and washed with water to remove copper sulfate, yielding 6-chloro-1,2-dihydro - 2,2 - dimethyl-4-phenylquinazoline 3-oxide as yellow prisms, M.P. 200–220°.

EXAMPLE 2

2-aminobenzophenone oxime of unspecified configuration (454 g.), acetone (6 l.) and cupric sulfate pentahydrate (30 g., fine powder) were heated under reflux overnight. The mixture was cooled to room temperature and insoluble material filtered off. The filtrate was concentrated in vacuo to small volume and the pale yellow solid collected, which upon recrystallization from acetone yielded 1,2-dihydro - 2,2 - dimethyl-4-phenylquinazoline 3-oxide as pale yellow prisms, M.P. 206–208°.

EXAMPLE 3

2-amino-5-nitrobenzophenone oxime of unspecified configuration (191.7 g., 0.746 mole), acetone (3 l.) and cupric sulfate pentahydrate (4 g., finely powdered) were heated under reflux overnight. The solution was concentrated to 1 l. under reduced pressure. The resulting solid was collected, washed with water to remove cupric sulfate, and recrystallized from acetone yielding 1,2-dihydro-2,2-dimethyl-6-nitro-4-phenylquinazoline 3-oxide, M.P. 200–205°, yellow prisms.

EXAMPLE 4

The α-oxime of 2-amino-5-trifluoromethylbenzophenone (2.0 g.), acetone (50 ml.), cupric sulfate (0.1 g. of pentahydrate) and acetic acid (2 drops) were heated under reflux for 21 hours. The solution was concentrated in vacuo and the residue crystallized from ether, collected, washed with water and recrystallized from 2-propanol yielding 1,2 - dihydro-2,2-dimethyl-4-phenyl-6-trifluoromethylquinazoline 3-oxide as yellow needles, M.P. 224–226°.

EXAMPLE 5

6 - chloro - 1,2 - dihydro-2,2-dimethyl-4-phenylquinazoline 3-oxide (10 g.) was ground to a powder and stirred with 3 N hydrochloric acid (100 ml.) at room temperature for 2 hours. The resulting white solid was filtered off and suspended in water (100 ml.). The suspension was then neutralized with solid sodium carbonate, filtered, and the solid filtrate washed with water (100 ml.) by removing the solid from the filter and resuspending. The so-obtained pale yellow solid was recrystallized from benzene yielding a colorless material which was dissolved in ether (100 ml.) and washed with 10% sodium bicarbonate solution (50 ml.). The organic phase was dried (sodium sulfate) and evaporated in vacuo. The residue was then crystallized from benzene giving 2-amino-5-chlorobenzophenone β-oxime as white plates, M.P. 129–132.5°.

EXAMPLE 6

1,2-dihydro-2,2-dimethyl - 4 - phenylquinazoline 3-oxide (10 g.) was finely ground and added to 3 N hydrochloric acid (250 ml.). After the suspension had been stirred for 1 hour 20 minutes, the solid was filtered off and suspended in water (150 ml.). The suspension was then neutralized with solid sodium carbonate, the product collected, washed with water and worked up as in Example 5 to give 2-aminobenzophenone β-oxime, M.P. 123–129°.

EXAMPLE 7

1,2 - dihydro-2,2-dimethyl-6-nitro-4-phenylquinazoline 3-oxide (5.0 g.) was dissolved in boiling ethanol (100 ml.). Concentrated hydrochloric acid (2 ml.) was added and the mixture kept at reflux for 5 minutes. Cold water (100 ml.) was then added and after the mixture had stood for about 0.5 hour, the precipitate was collected, and washed with water (2 x 25 ml.). Recrystallization from aqueous ethanol yielded 2-amino-5-nitrobenzophenone β-oxime, M.P. 200–206°.

EXAMPLE 8

1,2-dihydro-2,2-dimethyl - 4 - phenyl - 6 - trifluoromethylquinazoline 3-oxide (1.0 g.) in a finely divided state was added to 3 N hydrochloric acid (50 ml.) and the suspension stirred at room temperature for 45 minutes. The solid was filtered off and suspended in water (100 ml.). Since the product did not crystallize readily on the addition of sodium carbonate, methylene chloride (75 ml.) was also added. The aqueous phase was made alkaline with solid sodium carbonate, and the phases separated. After drying (sodium sulfate) the methylene chloride solution was concentrated to leave a yellow oil which was crystallized from benzene/hexane to give 2-amino-5-trifluoromethylbenzophenone β-oxime as an off-white solid, M.P. 113–116° (sinter at 110°).

EXAMPLE 9

6′-chloro - 1,3 - dimethyl - 4′ - phenylspiro(piperidino-4,2′-(1′H)-quinazoline) 3-oxide (1.9 g.) was stirred with 3 N hydrochloric acid (50 ml.) for 1.5 hours. The resulting solid was filtered off and suspended in water (100 ml.). The suspension was then neutralized with solid sodium carbonate in the presence of some methylene chloride (to aid crystallization). The methylene chloride was boiled off and the yellow solid collected and recrystallized from benzene/hexane yielding 2-amino-5-chlorobenzophenone β-oxime melting at 129–132°.

EXAMPLE 10

6-chloro - 2,2 - bis(chloromethyl)-1,2-dihydro-4-phenylquinazoline 3-oxide (5 g.), dioxane (25 ml.) and methanolic hydrogen chloride (4 ml. of 7 M) were heated under reflux for 40 minutes. The mixture was cooled, diluted with ether (100 ml.) and allowed to stand overnight. The precipitate was collected, and suspended in water. The suspension was then neutralized with solid sodium carbonate and the resulting solid collected and recrystallized from benzene/hexane yielding 2-amino-5-chlorobenzophenone β-oxime, M.P. 124–131°.

EXAMPLE 11

Chloroacetaldehyde diethylacetal (46 ml.) was heated under reflux for 15 min. with 1.5 N hydrochloric acid (46 ml., 0.069 mole). This solution was cooled to 10° and added to a cold (10°) solution of 2-amino-5-chlorobenzophenone β-oxime (49.3 g.) prepared by dissolving the oxime in warm ethanol (100 ml.) and cooling. The mixture was stirred without further cooling for 15 min. (reaction is exothermic). The product, 2-chloromethyl-6-chloro-1,2-dihydro-4-phenylquinazoline 3-oxide, separated and was collected and washed with hexane. Upon three recrystallizations from 2-propanol, it melted at 165–167°, yellow plates.

EXAMPLE 12

Preparation of 6-chloro-2-trichloromethyl-1,2-dihydro-4-phenyl-quinazoline 3-oxide A mixture of 24.65 g. (0.1 mole; 0.07 mole β-isomer) of crude 2-amino-5-chlorobenzophenone β-oxime, 33.1 g. (0.2 mole) of chloral, 0.5 g. of p-toluensulfonic acid and 500 ml. of benzene was refluxed under a Dean-Stark water separator for 4 hrs. During this time 5.2 ml. of water was collected. The reaction mixture was then cooled in an ice bath and the 6-chloro-2-trichloromethyl-1,2-dihydro-4-phenylquinazoline 3-oxide product was collected and washed with petroleum ether, M.P. 203–210°.

An analytical sample was obtained as yellow prisms, M.P. 180–210° (dec.) on repeated recrystallization from pyridine/water.

EXAMPLE 13

Preparation of 6-chloro-2-dichloromethyl-1,2-dihydro-4-phenyl-quinazoline 3-oxide from dichloroacetaldehyde and the β-oxime of 2-amino-5-chlorobenzophenone Dichloroacetaldehyde polymer was depolymerized by heating 200 g. of the commercial polymer in an oil bath at 180° and collecting the distillate. The fraction boiling between 90–120° which amounted to 171.5 g. (1.52 moles) was combined with 492.5 g. (2 moles) of 2-amino-5-chlorobenzophenone β-oxime in 1.3 l. of ethanol. This mixture was warmed for about 5 min. on the steam bath at which time the product began to crystallize. The mixture was then cooled in the refrigerator; the bright yellow 6-chloro-2-dichloromethyl - 1,2 - dihydro-4-phenyl-quinazoline 3-oxide was collected and washed with small portions of ethanol, ether and petroleum ether successively, M.P. 200–201°.

An analytical sample of the product was obtained as yellow needles, M.P. 203–206°, by recrystallization from tetrahydrofuran/water.

EXAMPLE 14

Preparation of 6-chloro-2-dichloromethyl-1,2-dihydro-4-phenyl-quinazoline 3-oxide from dichloroacetaldehyde and 6-chloro-1,2-dihydro-2,2-dimethyl-4-phenylquinazoline 3-oxide A mixture of 10 g. (34.8 mmoles) of 6-chloro-1,2-dihydro-2,2-dimethyl-4-phenylquinazoline 3-oxide, 100 ml. of ethanol, 50 ml. of benzene and 10 ml. (approx. 100 mmoles) of crude distilled dichloroacetaldehyde was heated for 45 mm. while 100 ml. of solvent was distilled off. The dichloroacetaldehyde contained enough acid to catalyze the reaction. The mixture was cooled and the yellow 6-chloro-2-dichloromethyl - 1,2-dihydro-4-phenylquinazoline 3-oxide product collected, M.P. 195–198° (dec.).

EXAMPLE 15

Preparation of 6-chloro-2-dichloromethyl-1,2-dihydro-4-phenyl-quinazoline 3-oxide from dichloroacetaldehyde polymer and 6-chloro-1,2-dihydro-2,2-dimethyl-4-phenylquinazoline 3-oxide A mixture of 14.3 g. (50 mmoles) of 6-chloro-1,2-dihydro-2,2-dimethyl-4-phenylquinazoline 3-oxide, 150 ml. of ethanol and 6.78 g. (containing 60 mmoles of monomeric dichloroacetaldehyde) of dichloroacetaldehyde polymer were heated for 30 min. while 70 ml. of solvent was distilled off. The residual mixture was cooled; the yellow crystalline 6-chloro-2-dichloromethyl - 1,2 - dihydro-4-phenylquinazoline 3-oxide product filtered off and washed with ether and petroleum ether, M.P. 205–207°.

EXAMPLE 16

Preparation of 6-chloro-2-dichloromethyl-1,2-dihydro-4-phenylquinazoline 3-oxide from β-oxime of 2-amino-5-chlorobenzophenone and dichloroacetaldehyde polymer A mixture of 9.86 g. (40 mmoles) of 2-amino-5-chlorobenzophenone β-oxime, 5.65 g. dichloroacetaldehyde polymer (50 mmoles of dichloroacetaldehyde) and 125 ml. of ethanol was refluxed for 15 min. After the mixture had been cooled on ice, the 6-chloro-2-dichloromethyl-1,2-dihydro-4-phenylquinazoline 3-oxide product was collected and washed with ethanol and ether, M.P. 204–206°.

EXAMPLE 17

Preparation of 6-chloro-2-dichloromethyl-1,2-dihydro-4-phenylquinazoline 3-oxide from crude oxime of 2-amino-5-chlorobenzophenone and dichloroacetaldehyde A mixture of 6.15 g. (25 mmoles) of α- and β-oximes of 2-amino-5-chlorobenzophenone, 4 g. (35 mmoles) of distilled crude dichloroacetaldehyde, 50 ml. ethanol and 0.1 g. anhydrous cupric sulfate was heated under reflux 22.5 hrs. and then was cooled in the refrigerator. The 6-chloro-2-dichloromethyl-1,2-dihydro - 4 - phenylquinazoline 3-oxide, obtained as a yellow precipitate, was collected and washed with ethanol, M.P. 195–200° (dec.).

EXAMPLE 18

Preparation of 7-chloro-2-methylamine-5-phenyl-3H-1,4-benzodiazepine 4-oxide from 6-chloro-2-dichloromethyl-1,2-dihydro-4-phenylquinazoline 3-oxide A solution of 3.4 g. (10 mmoles) of 6-chloro-2-dichloromethyl-1,2-dihydro-4-phenylquinazoline 3-oxide in 100 ml. of liquid methylamine was stirred under a Dry Ice condenser for 2.5 hrs. and then the methylamine was allowed to evaporate slowly overnight. The residue was dissolved in 200 ml. of methylene chloride, the solution washed with a mixture of 50 ml. of 10 percent sodium carbonate solution and 50 ml. of ice and the methylene chloride phase dried over sodium sulfate. The solvent was removed in vacuo to give a yellow oil from which on addition of ether there was obtained 7-chloro-2-methylamine-5-phenyl-3H-1,4-benzodiazepine 4-oxide, M.P. 220–230° (sinters 190°). Recrystallization from about 15 ml. of ethanol gave the pure product.

EXAMPLE 19

Preparation of 7-chloro-2-methylamino-5-phenyl-3N-1,4-benzodiazepine 4-oxide from 6-chloro-2-dichloromethyl-1,2-dihydro-4-phenylquinazoline 3-oxide Into a suspension of 10 g. (29 mmoles) 6-chloro-2-dichloromethyl-1,2-dihydro-4-phenylqinazoline 3 - oxide in 250 ml. of methanol was bubbled gaseous methylamine for 5 hrs. The heat of reaction caused the methanol to reflux. A clear solution was formed which was allowed to stand at room temperature for 11 hrs., and was then concentrated in vacuo. The residue was partitioned between 250 ml. of methylene chloride and 250 ml. of 10 percent sodium carbonate solution. The methylene chloride phase was dried over sodium sulfate and concentrated in vacuo to give 11.9 g. of an orange solid. This was treated with ether to give 7-chloro-2-methylamino-5-phenyl-3H-1,4-benzodiazepine 4-oxide. Recrystallization from ethanol gave the product, melting at 236–236.5°.

EXAMPLE 20

Conversion of 6-chloro-2-dichloromethyl-1,2-dihydro-4-phenylquinazoline 3-oxide to 6-chloro-2-chloromethyl-4-phenylquinazoline 3-oxide To a solution of 13.6 g. (40 mmoles) of 6-chloro-2-dichloromethyl - 1,2 - dihydro - 4 - phenylquinazoline 3-oxide in 500 ml. of dry tetrafuran cooled in a Dry Ice/acetone bath was added 4.48 g. (40 mmoles) of potassium t-butoxide. The mixture was removed from the cooling bath and allowed to stand overnight at room temperature. It was then filtered through Celite and the filtrate concentrated in vacuo to give a yellow oil which was dissolved in methylene chloride and washed three times with water and then with brine. The methylene chloride solution was dried over sodium sulfate and filtered through alumina (Woolm). The effluent was concentrated in vacuo and the residue crystallized from ether and then from cyclohexane to give 6 - chloro-2-chloromethyl-4-phenylquinazoline 3-oxide, M.P. 109–112°.

What is claimed is:
1. A method of preparing quinazoline 3-oxides of the formula

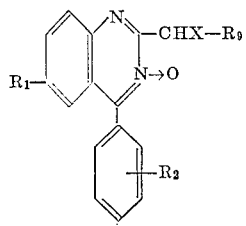

wherein $R_1$ is selected from the group consisting of hydrogen, halogen, lower alkyl, lower alkoxy, nitro, trifluoromethyl, cyano and lower alkylthio; $R_2$ is selected from the group consisting of hydrogen and halogen; $R_9$ is a member selected from the group consisting of hydrogen and alkyl of 1 to 6 C atoms; and X is halogen
which comprises treating a compound of the formula

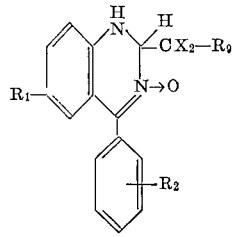

wherein $R_1$, $R_2$, $R_9$ and X have the same significance as above
with a *nonnucleophilic* strong base.

References Cited
UNITED STATES PATENTS 3,398,139    8/1968    Field et al. _____ 260—239

NICHOLAS S. RIZZO, Primary Examiner

R. V. RUSH, Assistant Examiner

PO-1050
(5/69)

UNITED STATES PATENT OFFICE
CERTIFICATE OF CORRECTION

Patent No. 3,509,145          Dated April 28, 1970

Inventor(s) George Francis Field and Leo Henryk Sternbach

It is certified that error appears in the above-identified patent and that said Letters Patent are hereby corrected as shown below:

Column 1, lines 60-70 - formula I -

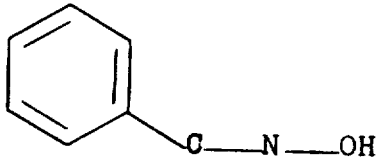 should be 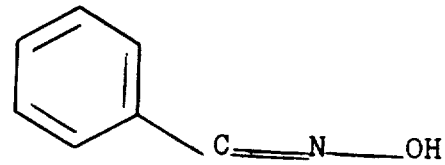

(Page 2, lines 2-8 of our specification.)

Column 4, lines 30-40 - formula IV -

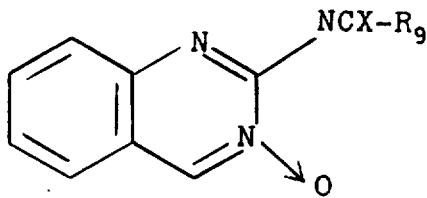 should be 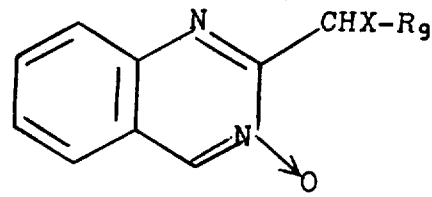

(Our Amendment dated May 5, 1969 -page 3).
Signed and sealed this 6th day of October 1970.

(SEAL)
Attest:

Edward M. Fletcher, Jr.
Attesting Officer

WILLIAM E. SCHUYLER, JR.
Commissioner of Patents